(12) United States Patent

Ikeda

(10) Patent No.: US 7,346,721 B2
(45) Date of Patent: Mar. 18, 2008

(54) METHOD AND DEVICE FOR CONNECTING A STORAGE DEVICE WITH A PLURALITY OF CONTROLLERS TO A HOST COMPUTER DURING POWER-ON TIME OR HOT PLUG TIME

(75) Inventor: Eiji Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 99 days.

(21) Appl. No.: 11/231,941

(22) Filed: Sep. 22, 2005

(65) Prior Publication Data

US 2006/0294281 A1 Dec. 28, 2006

(30) Foreign Application Priority Data

Jun. 27, 2005 (JP) ............................. 2005-186342

(51) Int. Cl.
*G06F 13/00* (2006.01)
(52) U.S. Cl. ...................... 710/302; 710/306; 710/38; 711/114; 711/154
(58) Field of Classification Search ........ 710/300–306, 710/309–317, 35–38, 62–64, 72; 711/114, 711/154
See application file for complete search history.

(56) References Cited

U.S. PATENT DOCUMENTS

| 5,950,230 | A | * | 9/1999 | Islam et al. ................. 711/156 |
| 6,665,743 | B2 | * | 12/2003 | Benhase et al. ............. 710/10 |
| 6,671,751 | B1 | * | 12/2003 | Chen et al. .................. 710/36 |
| 6,952,794 | B2 | * | 10/2005 | Lu ................................ 714/7 |

FOREIGN PATENT DOCUMENTS

JP  61-61264  3/1986

* cited by examiner

*Primary Examiner*—Raymond N Phan
(74) *Attorney, Agent, or Firm*—Staas & Halsey LLP

(57) ABSTRACT

A method of connecting a storage device to a host computer has a first connection processing for enabling a host interface in advance even when the storage device is not ready yet, and a second connection processing for enabling the host interface after the storage device is ready. The first connection processing is carried out when a power supply to the storage device is turned on, and the second connection processing is carried out when the storage device is at a hot plug time.

5 Claims, 4 Drawing Sheets

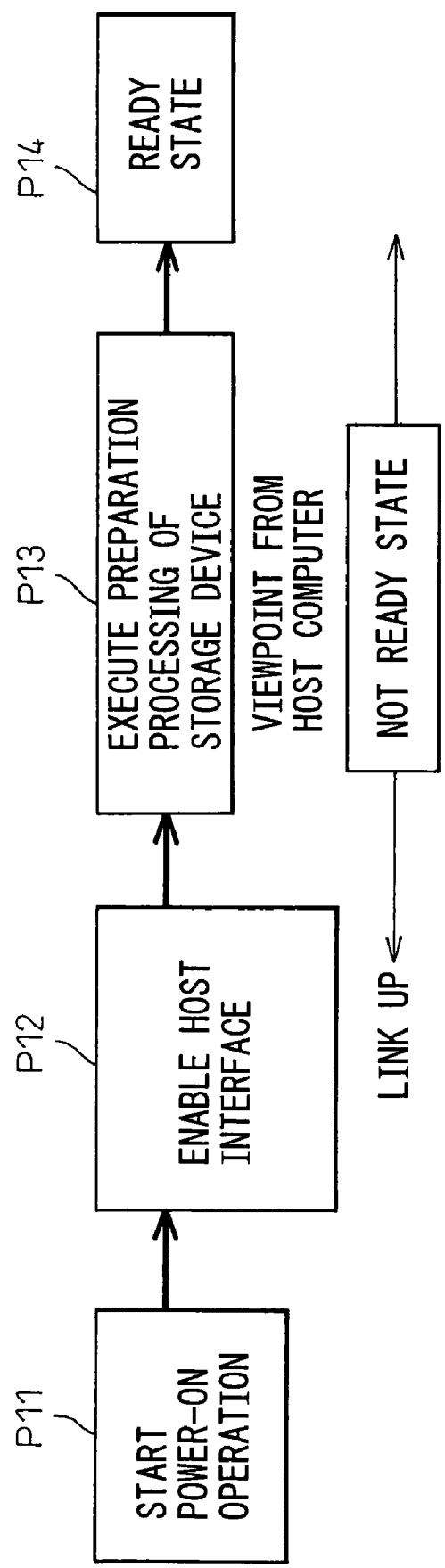

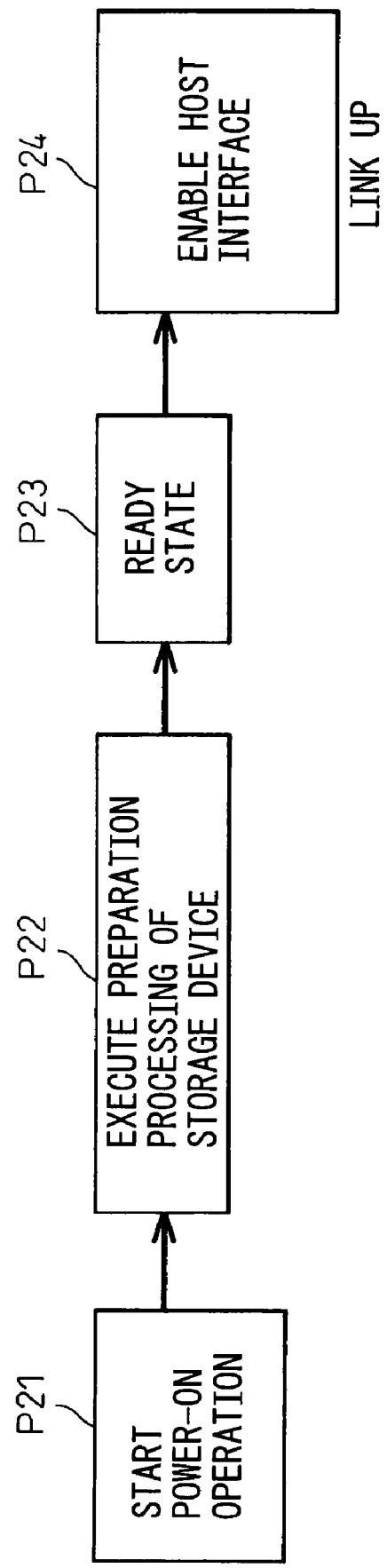

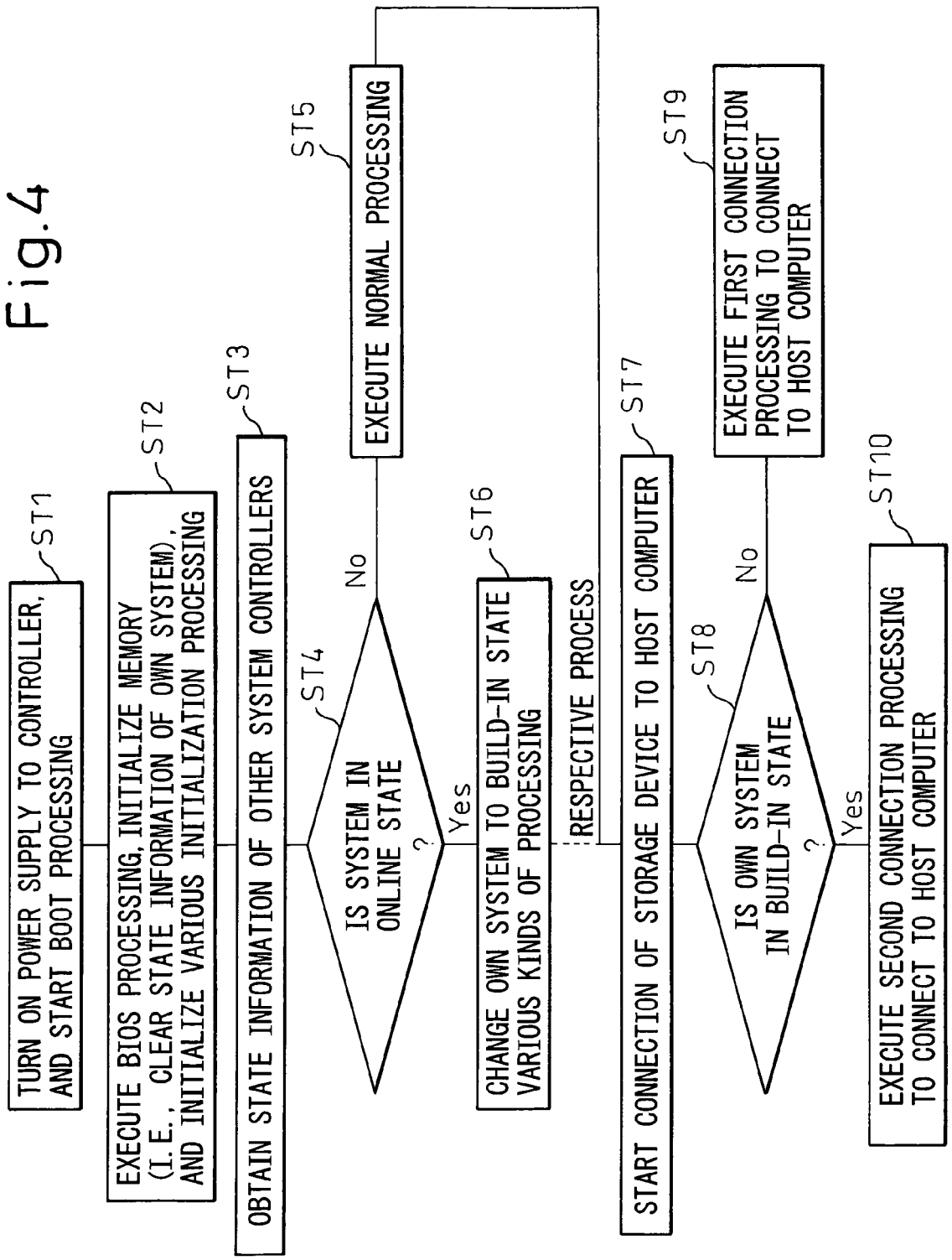

METHOD AND DEVICE FOR CONNECTING A STORAGE DEVICE WITH A PLURALITY OF CONTROLLERS TO A HOST COMPUTER DURING POWER-ON TIME OR HOT PLUG TIME

CROSS REFERENCE TO RELATED APPLICATION

This application is based upon and claims the benefit of priority from the prior Japanese Patent Application No. 2005-186342, filed on Jun. 27, 2005, the entire contents of which are incorporated herein by reference.

BACKGROUND OF THE INVENTION

1. Field of the Invention

The present invention relates to a storage device and a method of connecting a storage device to a host computer. More particularly, the present invention relates to a technique of connecting a storage device to a host computer when the system power supply is turned on, and when the hot plug (hot swap or concurrent firmware upgrade) is carried out.

2. Description of the Related Art

In order to set a storage device to a ready state, a certain constant time is necessary after a power supply is turn on. Specifically, in a Redundant Array of Independent (or Inexpensive) Disks device (RAID device), for example, several tens of seconds to a few minutes are necessary to spin up the hard disk drives (HDDs). Further, because it is also necessary to restore a saved RAID configuration, the storage device cannot be set to a ready state immediately after the power supply is turned on.

However, when a host interface is enabled, after the storage device becomes ready, by completely ending a POST process of the power supply to the storage device, there is a risk that a host computer cannot carry out a device scan in time and cannot recognize the storage device.

To overcome this difficulty, at the power-on time, the host interface is enabled in advance even when the storage device is not yet ready, thereby making the host computer recognize the storage device so that the storage device can be connected to the host computer.

There is a proposal of a data reading control system in a magnetic disk device as described in Japanese Unexamined Patent Publication No. 61-061264, for example. According to this proposal, in a magnetic disk device, in order to read data in a shortest waiting time after a motor is turned on (i.e., spin up), a data reading command is given to a magnetic disk control large-scale integration (LSI) by turning on the motor, and detection of an address mark in a read data signal from the magnetic disk is started. With this arrangement, a data reading operation is made possible before a ready signal actually becomes active.

Conventionally, a RAID device has a hot plug function (hot swap of a component or concurrent firmware upgrade within the system), without affecting the operation. This hot plug function is also provided in various kinds of storage devices, including a magnetic tape recording unit, and not only in the RAID device.

At the hot plug time, when the host interface is enabled in advance even when the storage device is not yet ready after the power supply is turned on, there is a risk of the occurrence of an inconvenience. When the storage device responds as not ready when the host computer accesses the storage device triggered by the enabling of the host interface (for example, when the Fibre Channel (FC) and the Internet Small Computer System Interface (iSCSI) are linked up), the host computer decides that this storage device has a problem. As a result, the host computer fails in making a reconnection in some cases.

The FC is one of interfaces able to carry out a serial transfer. The FC makes it possible to carry out a high-speed transfer and a long-distance transfer between the host computer and the storage device. The iSCSI is a protocol standard to carry out a transmission and reception of data via the Internet Protocol (IP) network, by covering the SCSI command/data in a transmission frame of a Transmission Control Protocol/Internet Protocol (TCP/IP) packet.

As explained above, in the connection of the storage device to the host computer (i.e., a boot processing of the controller), the connection processing suitable for execution after the power supply to the storage device is turned on has a risk of the occurrence of a problem when the storage device is connected to the host computer at the hot plug time.

SUMMARY OF THE INVENTION

An object of the present invention is to provide a storage device and a method of connecting a storage device to a host computer suitable for both a power-on time and a hot plug time.

According to the present invention, there is provided a method of connecting a storage device to a host computer, comprising a first connection processing for enabling a host interface in advance even when the storage device is not ready yet, and a second connection processing for enabling the host interface after the storage device is ready, wherein the first connection processing is carried out when a power supply to the storage device is turned on; and the second connection processing is carried out when the storage device is in a hot plug time.

The storage device may comprise at least two controllers; one of the controllers may obtain state information of the other controllers, and decide whether the other controllers are in an online state; when the other systems are in the online state, the own system may be changed to a build-in state, and a connection to a host computer may be started, and when the other systems are not in the online state, a normal processing may be carried out, and a connection to the host computer may be started; and when the own system is not in the build-in state among at least the two controllers, the first connection processing may be carried out to connect the storage device to the host computer, and when the own system is in the build-in state, the second connection processing may be carried out to connect the storage device to the host computer.

According to the present invention, there is also provided a storage device that can carry out a hot plug, comprising a first connection processing unit that enables a host interface in advance before the storage device is not ready yet, and connects the storage device to a host computer, when a power supply to the storage device is turned on; and a second connection processing unit that enables the host interface after the storage device is ready, and connects the storage device to the host computer, when the storage device carries out the hot plug.

The storage device may further comprise at least two controllers, wherein: one of the controllers may have a unit that obtains state information of the other controllers, and decide whether the other controllers are in an online state; a unit that may change the own system to a build-in state, and start a connection to a host computer when the other systems are in the online state, and that may carry out a normal processing, and start a connection to the host computer when the other systems are not in the online state; and a unit that may carry out the first connection processing to connect the storage device to the host computer when the own system is not in the build-in state among at least the two controllers, and that may carry out the second connection processing to connect the storage device to the host computer when the own system is in the build-in state.

Further, according to the present invention, there is provided a program for connecting a storage device to a host computer, comprising a first connection procedure for enabling a host interface in advance even when the storage device is not ready yet, and a second connection procedure for enabling the host interface after the storage device is ready, wherein the program makes a computer execute a first connection procedure when the power supply to the storage device is turned on; and a second connection procedure when the storage device is at the hot plug time.

The storage device may be a Redundant Array of Independent Disks device.

BRIEF DESCRIPTION OF THE DRAWINGS

The present invention will be more clearly understood from the description of the preferred embodiments as set forth below with reference to the accompanying drawings, wherein:

FIG. 2 is an explanatory diagram of a first connection processing for connecting a storage device to a host computer according to the present invention;

FIG. 3 is an explanatory diagram of a second connection processing for connecting a storage device to a host computer according to the present invention; and FIG. 4 is a flowchart for explaining one example of a connection processing for connecting a storage device to a host computer according to the present invention.

DESCRIPTION OF THE PREFERRED EMBODIMENTS

Figure 1:
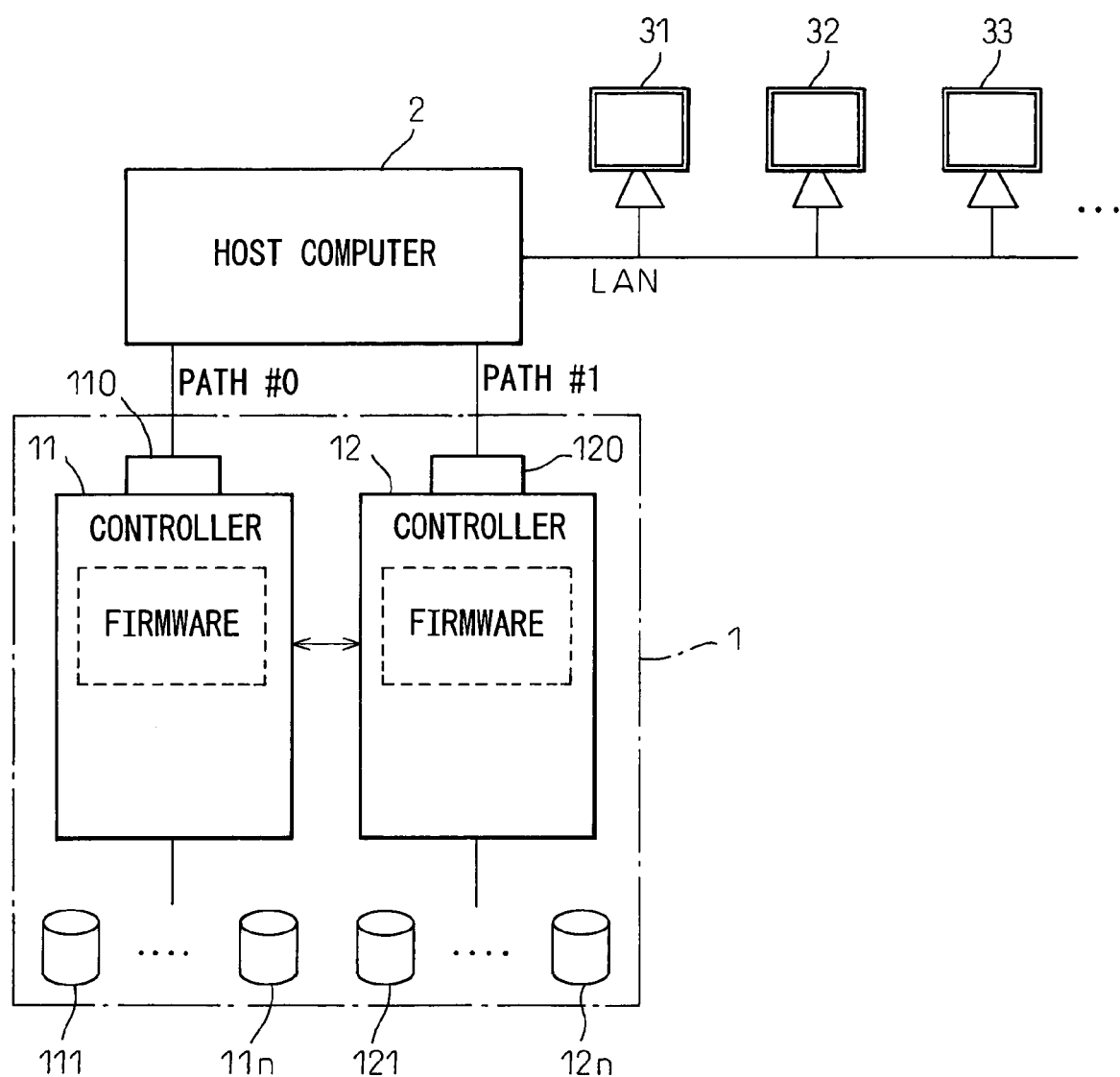
FIG. 1 is a block diagram schematically showing an example of a configuration of a system to which a storage device according to the present invention is applied.

A storage device and a method of connecting a storage device to a host computer according to embodiments of the present invention are explained in detail below with reference to the accompanying drawings.

FIG. 1 is a block diagram schematically showing an example of a configuration of a system to which a storage device according to the present invention is applied. In FIG. 1, a reference numeral 1 denotes a storage device, 2 denotes a host computer, and 31, 32, 33, etc. denote terminal devices.

As shown in FIG. 1, the storage device 1 includes controllers 11 and 12. Plural hard disk units 111 to 11n and 121 to 12n are connected to the controllers 11 and 12 respectively. The controllers 11 and 12 have host interfaces 110 and 120 respectively, and are connected to the host computer 2 via a path #0 and a path #1 corresponding to the host interfaces 110 and 120 respectively. The terminal devices 31, 32, 33, etc. are connected to the host computer 2 via a local area network (LAN), for example.

The controllers 11 and 12 have a micro processing unit (MPU), and a flash electrically erasable programmable read-only memory (EEPROM) storing firmware, not shown, respectively. The controllers 11 and 12 control the hard disk units 111 to 11n and 121 to 12n respectively, following instructions from the host computer 2, thereby managing a large amount of data.

The storage device 1 is a RAID device, for example. The storage device 1 carries out a redundant storing of data, by mirroring, based on the two systems of hard disks of the controllers 11 and 12. Alternatively, the storage device 1 has more controllers, and efficiently spreads and stores data and parity, to carry out efficient restoring of the data when trouble occurs.

The present invention can be widely applied to various kinds of storage devices in which a hot plug is possible, not only to the RAID device. The hot plug refers to the exchange of a component (hot swap) and firmware (concurrent firmware upgrade) within a system without affecting the operation. In the hot plug, once a controller of the storage device is disconnected from the host computer, and then the controller of the storage device is reconnected to the host computer.

The system shown in FIG. 1 is used for various kinds of operation such as customer information management in banks, and advanced booking of air tickets. In the present invention, a method of connecting a storage device to a host computer is provided as firmware (i.e., a program) of the controllers 11 and 12 shown in FIG. 1, for example. The controller (i.e., a kind of computer) can execute this connection processing method.

FIG. 2 is an explanatory diagram of a first connection processing for connecting a storage device to a host computer according to the present invention. Even when the storage device is not ready, the host interface is enabled according to this method.

As shown in FIG. 2, in the first connection processing of the method of connecting a storage device to a host computer according to the present invention, the power supply is turned on to start operation (P11). Then, even when the storage device 1 is not ready, the host interfaces 110 and 120 of the controllers 11 and 12 are enabled (P12). Thereafter, a preparation processing of the storage device 1 is carried out. For example, the hard disk unit of the RAID device is spun up, and the saved RAID configuration is restored (P13). After this processing (P13), the storage device 1 becomes ready.

As explained above, in the first connection processing of the method of connecting a storage device to a host computer according to the present invention, the host interfaces 110 and 120 are enabled when the storage device is not in the ready state, that is, before the hard disk unit of the RAID device is spun up and before the saved RAID configuration is restored. In this state, the storage device 1 is linked up to the host computer 2. Therefore, from the viewpoint of the host computer 2, the storage device 1 is not ready during the period from when the storage device 1 is linked up to the host computer 2 (P12) until the preparation processing of the storage device 1 ends (P13) and the storage device 1 becomes ready (P14).

FIG. 3 is an explanatory diagram of a second connection processing for connecting a storage device to a host computer according to the present invention. According to this method, the storage device becomes in the ready state when the storage device 1 is linked up to the host computer 2.

As shown in FIG. 3, in the second connection processing of the method of connecting a storage device to a host computer according to the present invention, when the power supply is turned on to start operation (P21), the preparation processing of the storage device 1 is carried out (P22), and then the storage device 1 becomes ready (P23).

Thereafter, the host interfaces 110 and 120 of the controllers 11 and 12 are enabled (P24), and the storage device 1 is linked up to the host computer 2.

As explained above, in the second connection processing of the method of connecting a storage device to a host computer according to the present invention, the storage device becomes in the ready state after the preparation processing of the storage device 1 is over, that is, after the hard disk unit of the RAID device is spun up and after the saved RAID configuration is restored. When the storage device 1 is linked up to the host computer 2, the storage device 1 is already in the ready state.

According to the method of connecting a storage device to a host computer in the present invention, the first connection processing is carried out when the power supply to the storage device is turned on, and the second connection processing is carried out when the hot plug is carried out.

In other words, according to a normal boot processing, the first connection processing for making the storage device ready, after the not ready state, is carried out. On the other hand, when the hot plug is carried out, the second connection processing is carried out. That is, the operator gives a hot plug instruction to the controller of the storage device using the Web or the like. The controller of the storage device checks whether the boot is carried out after the hot plug, and links up after the storage device becomes ready. With this arrangement, the storage device can be connected to the host computer suitable for both when the power supply is turned on and when the hot plug is carried out.

According to the method of connecting a storage device to a host computer in the present invention, the controllers 11 and 12 of the storage device 1 manage the states of the own controllers respectively based on a state code. At the start of the boot processing, this code is in the cleared initialized state. Thereafter, the state code is updated in the middle of the starting. After the device has normally started, the code shows the "online" state. In an abnormal state, the code shows other state.

At an early stage of the boot processing (for example, at the end of the Basic Input Output System (BIOS) processing, at the end of a program loading, or immediately after the initialization of each module), a state of the other system is obtained by communications between the controllers. In this case, when the other system is in the "online" state, the own system is booting, and is in the "build-in" state. Thereafter, until the booting of the own system is completed and the own system becomes in the "online" state, the own system is in the "build-in" state. Therefore, in the connection processing with the host computer in the middle of the boot processing, it is possible to decide whether the hot plug is possible.

The controller is not limited to the two controllers of the other system and the own system. It is needless to mention that the present invention can be also applied to a device having three or more controllers. When the device has three or more controller, a master controller is present. A controller in the boot enquires of the master controller about the hot plug through communications with other controllers. Alternatively, controllers can communicate with each other to obtain a state of the master controller, and can decide about the hot plug.

The method of connecting a storage device to a host computer according to the present invention is explained below with reference to a flowchart shown in FIG. 4.

As shown in FIG. 4, at step ST1, the power supply to the controllers is turned on, and the boot processing of the storage device 1 (i.e., the controllers 11 and 12) is started. At step ST2, the BIOS processing is carried out, the memory is initialized (i.e., state information of the own system is cleared), and various initialization processing is carried out.

At step ST3, state information of other system controllers is obtained, and process proceeds to step ST4. In other words, at step ST3, when the storage device 1 includes the two controllers 11 and 12 as shown in FIG. 1, one of the controllers 11 (or 12) obtains state information of the other controller 12 (or 11).

At step ST4, it is decided whether the system is in the online state. When it is decided that the system is not in the online state, the normal processing is carried out at step ST5, and the process proceeds to step ST7. On the other hand, when it is decided at step ST4 that the system is in the online state, the own system is changed to the build-in state, and the connection of the storage device to the host computer is started at step ST7.

When the connection of the storage device to the host computer is started at step ST7, it is decided at step ST8 whether the own system is in the build-in state. When it is decided at step ST8 that the own system is not in the build-in state, that is, the own system is in the normal boot at the system power-on time not at the hot plug time, the first connection processing is carried out at step ST9. On the other hand, when it is decided at step ST8 that the own system is in the build-in state, that is, the own system is in the normal boot at the hot plug time not at the system power-on time, the second connection processing is carried out at step ST10.

The method of connecting a storage device to a host computer according to the present invention can be provided as firmware (i.e., a program) that the controller of the storage device such as the RAID device executes. This program can be stored in a flash EEPROM or other recording medium, and can be provided to a user in this state.

As explained above, according to the present invention, it is possible to provide a storage device and a method of connecting a storage device to a host computer that are suitable for both the power-on time and the hot plug time.

The present invention can be applied to various kinds of storage devices, such as a magnetic tape recording unit, and not only the RAID device. Particularly, a storage device, in which the hot plug is possible, can be connected to the host computer when the system power is turned on, and a reconnection processing can be suitably carried out at the hot plug time.

Many different embodiments of the present invention may be constructed without departing from the scope of the present invention, and it should be understood that the present invention is not limited to the specific embodiments described in this specification, except as defined in the appended claims.

What is claimed is:

1. A method of connecting a storage device to a host computer, comprising:
 a first connection processing for enabling a host to interface in advance before said storage device is ready; and
 a second connection processing for enabling said host to interface after said storage device is ready, wherein
 the first connection processing is carried out when a power supply to said storage device is turned on;
 the second connection processing is carried out when said storage device is at a hot plug time;
 said storage device comprises at least two controllers;
 one of said controllers obtains state information of other said controllers, and decides whether the other said controllers are in an online state;

when other systems are in the online state, an own system is changed to a build-in state, and a connection to a host computer is started, and when other systems are not in the online state, a normal processing is carried out, and a connection to said host computer is started; and when an own system is not in the build-in state among at least two said controllers, the first connection processing is carried out to connect said storage device to said host computer, and when an own system is in the build-in state, the second connection processing is carried out to connect said storage device to said host computer.

2. The method of connecting a storage device to a host computer as claimed in claim 1, wherein said storage device is a Redundant Array of Independent Disks device.

3. A storage device that can carry out a hot plug, comprising:

a first connection processing unit that enables a host to interface in advance before said storage device is ready, and connects said storage device to a host computer, when a power supply to said storage device is turned on;

a second connection processing unit that enables said host to interface after said storage device is ready, and connects said storage device to said host computer, when said storage device carries out the hot plug; and at least two controllers, wherein at least one of said controllers has a unit that obtains state information of other said controllers, and decides whether the other said controllers are in an online state;

a unit that changes an own system to a build-in state, and starts a connection to a host computer when other systems are in the online state, and that carries out a normal processing, and starts a connection to said host computer when other systems are not in the online state; and a unit that carries out the first connection processing to connect said storage device to said host computer when an own system is not in the build-in state among at least two said controllers, and that carries out the second connection processing to connect said storage device to said host computer when an own system is in the build-in state.

4. The storage device as claimed in claim 3, wherein said storage device is a Redundant Array of Independent Disks device.

5. A computer-readable storage medium including a program for connecting a storage device to a host computer, the program causing a computer to execute the process comprising:

a first connection procedure for enabling a host to interface in advance before said storage device is ready; and a second connection procedure for enabling said host to interface after said storage device is ready, wherein the first connection procedure is executed when a power supply to the storage device is turned on;

the second connection procedure is executed when said storage device is at a hot plug time;

said storage device comprises at least two controllers;

one of said controllers obtains state information of other said controllers, and decides whether the other said controllers are in an online state;

when other systems are in the online state, an own system is changed to a build-in state, and a connection to a host computer is started, and when other systems are not in the online state, a normal processing is carried out, and a connection to said host computer is started; and when an own system is not in the build-in state among at least two said controllers, the first connection processing is carried out to connect said storage device to said host computer, and when an own system is in the build-in state, the second connection processing is carried out to connect said storage device to said host computer.

* * * * *